(12) United States Patent
Harris et al.

(10) Patent No.: US 9,160,611 B2
(45) Date of Patent: Oct. 13, 2015

(54) SYSTEM AND METHOD FOR PERFORMING LONGEST COMMON PREFIX STRINGS SEARCHES

(75) Inventors: Christopher K. Harris, San Diego, CA (US); Hal Lonas, Carlsbad, CA (US)

(73) Assignee: Webroot Inc., Broomfield, CO (US)

( * ) Notice: Subject to any disclaimer, the term of this patent is extended or adjusted under 35 U.S.C. 154(b) by 664 days.

(21) Appl. No.: 12/757,972

(22) Filed: Apr. 9, 2010

(65) Prior Publication Data
US 2010/0274786 A1    Oct. 28, 2010

Related U.S. Application Data

(60) Provisional application No. 61/171,837, filed on Apr. 22, 2009, provisional application No. 61/172,703, filed on Apr. 24, 2009.

(51) Int. Cl.
| | | |
|---|---|---|
| *G06F 7/00* | (2006.01) | |
| *G06F 17/30* | (2006.01) | |
| *H04L 29/12* | (2006.01) | |
| *H04L 12/743* | (2013.01) | |
| *H04L 29/06* | (2006.01) | |

(52) U.S. Cl.
CPC .... *H04L 29/12594* (2013.01); *G06F 17/30076* (2013.01); *G06F 17/30289* (2013.01); *G06F 17/30569* (2013.01); *H04L 45/7457* (2013.01); *H04L 61/301* (2013.01); *H04L 63/10* (2013.01); *H04L 63/168* (2013.01)

(58) Field of Classification Search
CPC .................... G06F 17/30569; G06F 17/30076; G06F 17/30289
USPC ........................................................... 707/756
See application file for complete search history.

(56) References Cited

U.S. PATENT DOCUMENTS

| | | | | |
|---|---|---|---|---|
| 5,153,591 | A * | 10/1992 | Clark ............................... 341/51 |
| 5,339,398 | A * | 8/1994 | Shah et al. .................... 711/216 |
| 5,585,793 | A * | 12/1996 | Antoshenkov et al. .......... 341/51 |
| 5,659,737 | A * | 8/1997 | Matsuda ....................... 707/693 |
| 5,861,827 | A * | 1/1999 | Welch et al. ..................... 341/51 |
| 5,933,104 | A | 8/1999 | Kimura |
| 6,236,341 | B1 | 5/2001 | Dorward et al. |
| 6,598,051 | B1 | 7/2003 | Wiener et al. |
| 6,658,463 | B1 * | 12/2003 | Dillon et al. ................... 709/219 |
| 6,700,512 | B2 * | 3/2004 | Abdat ............................. 341/87 |
| 6,704,730 | B2 * | 3/2004 | Moulton et al. ...................... 1/1 |
| 6,789,077 | B1 | 9/2004 | Slaughter et al. |
| 7,256,715 | B1 * | 8/2007 | Langhammer .................. 341/51 |
| 7,299,317 | B1 * | 11/2007 | Panigrahy et al. ............. 711/108 |
| 7,383,299 | B1 * | 6/2008 | Hailpern et al. ............... 709/203 |
| 7,386,527 | B2 | 6/2008 | Harris et al. |
| 7,443,841 | B2 * | 10/2008 | Davis ............................ 370/356 |
| 7,472,167 | B2 | 12/2008 | Tarquini |

(Continued)

OTHER PUBLICATIONS

International Search Report for PCT/US2010/030652.

*Primary Examiner* — Mark E Hershley
(74) *Attorney, Agent, or Firm* — Merchant & Gould P.C.

(57) ABSTRACT

A method and system a method for compressing and searching a plurality of strings. The method includes inputting a plurality of strings into a compression engine. The method also includes converting each of the plurality of strings into a new, prefix-preserving compressed string, using the compression engine. For every string P that is a strict prefix of a string S, P's resulting compressed string is a strict prefix of S's resulting compressed string.

23 Claims, 10 Drawing Sheets

(56) References Cited

U.S. PATENT DOCUMENTS

| | | | |
|---|---|---|---|
| 7,487,169 B2* | 2/2009 | Agarwal | 1/1 |
| 7,519,903 B2 | 4/2009 | Yahagi | |
| 7,636,717 B1* | 12/2009 | Gupta et al. | 1/1 |
| RE41,152 E* | 2/2010 | Reynar et al. | 708/203 |
| 7,693,959 B2* | 4/2010 | Leighton et al. | 709/217 |
| 8,050,495 B2* | 11/2011 | Caruso et al. | 382/166 |
| 2002/0083178 A1* | 6/2002 | Brothers | 709/226 |
| 2003/0046361 A1* | 3/2003 | Kirsch et al. | 709/217 |
| 2003/0206125 A1* | 11/2003 | Abdat | 341/51 |
| 2003/0208563 A1 | 11/2003 | Acree et al. | |
| 2004/0006569 A1* | 1/2004 | Carlin et al. | 707/101 |
| 2004/0111439 A1* | 6/2004 | Richardson et al. | 707/200 |
| 2007/0150497 A1* | 6/2007 | De La Cruz et al. | 707/101 |
| 2007/0168560 A1* | 7/2007 | Alkire | 709/247 |
| 2007/0250480 A1* | 10/2007 | Najork | 707/3 |
| 2008/0059507 A1* | 3/2008 | Najork | 707/102 |
| 2008/0168135 A1* | 7/2008 | Redlich et al. | 709/204 |
| 2008/0307044 A1* | 12/2008 | Musson | 709/203 |
| 2010/0088524 A1* | 4/2010 | Ford et al. | 713/189 |

* cited by examiner

| X | | Y | |
|---|---|---|---|
| XX | XY | YX | YY |
| 0 | 4/9 | 6/9 | 8/9  1 |

SYSTEM AND METHOD FOR PERFORMING LONGEST COMMON PREFIX STRINGS SEARCHES

CROSS REFERENCE TO RELATED APPLICATION

The Present Application claims priority to U.S. Provisional Patent Application No. 61/171,837, filed on Apr. 22, 2009 and U.S. Provisional Patent Application No. 61/172,703, filed on Apr. 24, 2009, both of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention is generally related to compressing strings in a manner that allows for searching of a specific compressed string in the set of compressed strings. More specifically, the present invention is related to coding uniform resource locator (URL) strings for Internet accessibility analysis.

2. Description of the Related Art

The prior art disclosed various methods for compressing text strings. For example, compression of code using a ZIP file does not allow random access for searching purposes so compressing one hundred strings using a ZIP file does not allow a search for the string at line thirty. Further, the prior art discloses delivering data to customers using a one-way hash function to provide lookup capability for strings and associating information about those strings; in this case categories, confidences, and reputation.

One example of a one-way hash function is an MD5 hash, which processes a variable length string, file or URL into a fixed length output of 128 bits. Traditional MD5 string encryption formats provide a good balance between collision avoidance and length, but require an exact match of the input string with the hashed string to find it in the database. A slight variation in input string causes a large variation in the resultant MD5 hash.

MD5 hash is well known in the prior art. Traditional hashing works by generating a specific hash value for a given string. An example is instructive:
MD5("google.com")=
1d5920f4b44b27a802bd77c4f0536f5a If just one character is added to the input URL, the output hash is radically different:
MD5("google.com/")=
98f1c71b82281a60a7766c3355d575e6

Imagine a client looking up google.com in a database containing a series of hashes. If the client is off by just one character, a completely different hash is produced, and therefore google.com and its associated metadata (in this case classifications) will not be found in the database. Many applications of this technique exhibit "temporal locality" or the effect of many references to the same or similar strings over a short period of time. Therefore, if similar strings are "close" to each other in memory modern computer systems can benefit from various caching systems to maximize spatial and/or temporal locality. Unfortunately, a side effect of hash functions which uniformly distribute the hash keys of even very similar strings, is that they reduce the ability of modern computer systems to speed up access using common caching mechanisms such as disk controller caches, virtual memory paging, or the reading & storing of cache lines during memory reads.

| URL | MD5 hash |
| --- | --- |
| google.com/ig | 9b35374eeef4881fbbe97f2d0cf01958 |
| google.com/search="art" | 1ba6af01fb70cac2bbbc9d2c794cb693 |
| google.com/finance/djia | 14d36eab3f4e7601e39f203322bde406 |
| https://google.com | c7b920f57e553df2bb68272f61570210 |
| https:/google.com | 91da3280cd9485ca6d0c77098a6ce507 |

Because there is no way to determine the input strings for a given one-way hash value, a traditional way of solving this problem is to require the client to "test" many variations of the input string until a match is found. This is a way to achieve a "Longest Common Prefix" or LCP search over a set of strings using one-way hash functions. Strings can be broken down from most specific (longest) to least specific (shortest), and the iterative reduction lookups accomplish the LCP search, providing a method to test for more or less specific matches of a string in this list.

For example, using the example above:

| URL | LCP test |
| --- | --- |
| google.com/finance/djia | 1 (exact match not found) |
| google.com/finance | 2 (more general match not found) |
| google.com | 3 (most general and last test matches where md5 hash = 1d5920f4b44b27a802bd77c4f0536f5a) |

In general, using LCP requires the client to perform many searches for each string, and no feedback is given as to how close the matched string is with the exact original string (although the client may use various methods to deduce this such as string length comparisons, number of LCP tests performed before a match is found, etc.).

The prior art discloses many references pertaining to compression algorithms and/or search algorithms. For example, Hailpern et al., U.S. Pat. No. 7,383,299 for a System And Method For Providing Service For Searching Web Site Addresses discloses searching for an incorrectly spelled URL using fuzzy logic.

Tarquini, U.S. Pat. No. 7,472,167 for a System And Method For Uniform Resource Locator Filtering discloses URL filtering by determining a hash value for a specific URL and then searching a lexical search tree data structure to determine if the a match is found indicating that the URL is hostile.

Davis, U.S. Pat. No. 7,443,841 for a Longest Prefix Matching (LPM) Using A Fixed Comparison Hash Table discloses forwarding Internet Protocol (IP) packets by hashing a portion of a fixed length key to obtain a hash value required for obtaining routing information for forwarding the IP packet.

Agarwal, U.S. Pat. No. 7,487,169 for a Method For Finding The Longest Common Subsequences Between Files With Applications To Differential Compression discloses finding the longest matching substrings between a number of potentially large datasets by hashing sections of files to detect occurrences of substrings and building suffix arrays to find the longest matches.

Kimura, U.S. Pat. No. 5,933,104 for a Method And System For Compression And Decompression Using Variable-Sized Offset And Length Fields discloses an improvement of the LZRW1 algorithm that identifies a pattern of data by calculating a hash value for the pattern and encoding the pattern of data for compressing data.

The prior art discloses various compression algorithms. The LZRW1 algorithm uses the single pass literal/copy mechanism of the LZ77 class of algorithms to compress an uncompressed data sequence into a compressed data sequence. Bytes of data in the uncompressed data sequence are either directly incorporated into a compressed data sequence as a string (i.e., as "literal items") or, alternatively, are encoded as a pointer to a matching set of data that has already been incorporated into the compressed data sequence (i.e., as "copy items"). The copy items are encoded by offset and length values that require fewer bits than the bytes of data. The offset specifies the offset of the string being coded relative to its previous occurrence. For example, if a string of three characters occurred six bytes before the occurrence that is being encoded, the offset is six. The length field specifies the length of the matching data sequence in bytes. Compression is realized by representing as much of the uncompressed data sequence as possible as copy items. Literal items are incorporated into the compressed data sequence only when a match of three or more bytes cannot be found.

The LZ1 data compression process is based on the principle that a repeated sequence of characters can be replaced by a reference to an earlier occurrence of the sequence, i.e., matching sequences. The reference, e.g., a pointer, typically includes an indication of the position of the earlier occurrence, e.g., expressed as a byte offset from the start of the repeated sequence, and the number of characters, i.e., the matched length, that are repeated. Typically, the references are represented as "<offset, length>" pairs in accordance with conventional LZ1 coding. In contrast, LZ2 compression parses a stream of input data characters into coded values based on an adaptively growing look-up table or dictionary that is produced during the compression. That is, LZ2 does not find matches on any byte boundary and with any length as in LZ1 coding, but instead when a dictionary word is matched by a source string, a new word is added to the dictionary which consists of the matched word plus the following source string byte. In accordance with LZ2 coding, matches are coded as pointers or indexes to the words in the dictionary.

The definitions for terms used throughout this document are set forth below.

FTP or File Transfer Protocol is a protocol for moving files over the Internet from one computer to another.

HyperText Markup Language (HTML) is a method of mixing text and other content with layout and appearance commands in a text file, so that a browser can generate a displayed image from the file.

Hypertext Transfer Protocol (HTTP) is a set of conventions for controlling the transfer of information via the Internet from a Web server computer to a client computer, and also from a client computer to a Web server.

Internet is the worldwide, decentralized totality of server computers and data-transmission paths which can supply information to a connected and browser-equipped client computer, and can receive and forward information entered from the client computer.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer. JavaScript is discussed in greater detail below.

List Search Algorithm is an algorithm used to find a particular element of a list of elements and includes linear search algorithms, binary search algorithms, interpolation search algorithms, and others.

Metadata is generally defined as data about data.

Parser is a component of a compiler that analyzes a sequence of tokens to determine its grammatical structure with respect to a given formal grammar. Parsing transforms input text into a data structure, usually a tree, which is suitable for later processing and which captures the implied hierarchy of the input. XML Parsers ensure that an XML document follows the rules of XML markup syntax correctly.

String is a sequence of characters (numbers, letters, symbols and/or the like).

URL or Uniform Resource Locator is an address on the World Wide Web.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access. Servers usually contain one or more processors (CPUs), memories, storage devices and network interface cards. Servers typically store the HTML documents and/or execute code that generates Web-pages that are sent to clients upon request. An interactive-form information-collection process generally is controlled from a server computer, to which the sponsor of the process has access.

World Wide Web Consortium (W3C) is an unofficial standards body which creates and oversees the development of web technologies and the application of those technologies.

XHTML (Extensible Hypertext Markup Language) is a language for describing the content of hypertext documents intended to be viewed or read in a browser.

XML (Extensible Markup Language) is a W3C standard for text document markup, and it is not a language but a set of rules for creating other markup languages.

The prior fails to provide a solution to these problems and others.

BRIEF SUMMARY OF THE INVENTION

Generally, a novel means is provided for compressing strings, and searching the compressed data for an arbitrary string, or if that string is not in the set, then the closest string in the set of strings that matches the arbitrary string. In a preferred embodiment, the closest string in the set of strings has the longest common prefix (LCP) with the arbitrary string.

More specifically, a method and system is provided wherein multiple strings are compressed into a searchable set of compressed strings such that for every string P that is a strict prefix of a string S, P's resulting compressed string is a strict prefix of S's resulting compressed string.

In an example of a more preferred embodiment, one hundred lines of URLs are compressed into a compressed set of URLS utilizing a compression algorithm and the present invention allows for a specific URL at line thirty of the compressed set of URLS to be searched.

In its broadest sense, the method and system is implemented for performing IP lookups, domain name caching, phonebooks, and the like.

In a specific embodiment, arithmetic coding ("AC") is utilized for compressing strings to generate numerical AC Hash values for the strings which satisfy that for every string P that is a strict prefix of a string S, P's resulting AC hashed string is a strict prefix of S's resulting AC hashed string. Additional processing is done to correlate numeric hash ranges to other data for a specific client. A database (library) of the AC hash values is delivered to the specific client. The client utilizes the system and method to AC Hash "new" strings for which the client wishes to search in the database of AC hash values, and optionally receives data associated with a matched AC hash value, with an indication of which AC hash value in the database of AC hash values has the longest common prefix with the searched new string.

The AC Hash output has the property of generating an output that has a numeric proximity for strings that are also close in string values. This allows for prefix matching on strings and to apply a category across a "string range" of strings.

The system and method allows a user to find an input string with a "fuzzy" match to a list of compressed strings even if the input string is not an exact match to a compressed string in the list of compressed strings. Additional feedback can be provided to the user so that the user is aware of how closely the input string matches the returned result.

In a specific embodiment, AC is used to "hash" a list of input URLs at a data collection site to create a list of AC Hashed values for the input URLs. The list of input URLs can range in the tens of millions of URLs and even hundreds of millions URLs. The "AC Hash" algorithm a library of AC Hashed values for URLs are preferably supplied to a user as a client library or source code so that the user can AC Hash "new" input URLs and search for the AC Hash value of the new input URL in the library or a fuzzy match to the new input URL. The user sets an URL accessibility policy based on known URLs and uses the system and method to determine if a new input URL adheres to the policy and is permitted to be accessed by the user.

One aspect is a method for compressing a plurality of strings. The method includes inputting a plurality of strings into a compression engine. The method also includes converting each of the plurality of strings into a new, prefix-preserving compressed string, using the compression engine such that for every string P that is a strict prefix of a string S, P's resulting compressed string is a strict prefix of S's resulting compressed string.

Preferably, each of the plurality of strings represents a URL. Preferably, each of the plurality of URLs represents an Internet address.

Alternatively, each of the plurality of strings represents a name, a number, a street address or an IP address. Those skilled in the art can recognize the application to any plurality of strings which require searching and optionally prefix matching.

The method further comprises storing the plurality of compressed strings in an ordered list data structure, a database, a tree data structure, a graph data structure, or a trie data structure.

The method further comprises storing the plurality of compressed strings in a client library.

Preferably, the compression engine represents a dictionary based compression engine, an entropy based compression engine, a run-length compression engine, represents an LZ77 compression engine, an LZ78 compression engine, an LZW compression engine, a Huffman compression engine, a Golomb compression engine, a universal code compression engine, an Elias gamma compression engine, a dynamic markov compression engine, or an arithmetic compression engine.

Another aspect is a method for searching for a particular string among a plurality of prefix preserving compressed strings. The method includes inputting the plurality of strings into a compression engine. The method also includes compressing each of the plurality of strings into a new, prefix-preserving compressed string, using the compression engine such that for every string P that is a strict prefix of a string S, P's resulting compressed string is a strict prefix of S's resulting compressed string. The method also includes compressing the search string and applying a search algorithm to find the resulting compressed search string among the plurality of compressed strings.

Preferably, the search algorithm represents a linear search, a binary search or an interpolation search.

Preferably, the method further includes storing the plurality of compressed strings in a database, and wherein the search algorithm represents a select query, a full text search or a search or find database operation.

Alternatively, the method further includes storing the plurality of compressed strings in a tree data structure, and wherein the search algorithm represents a breadth-first search algorithm, a depth-first search algorithm or an A* search algorithm.

Alternatively, the method further includes storing the plurality of compressed strings in a graph data structure, and wherein the search algorithm represents a breadth-first search algorithm, a depth-first search algorithm or an A* search algorithm.

Alternatively, method further includes storing the plurality of compressed strings in a trie data structure, and wherein the search algorithm represents a breadth-first search algorithm, a depth-first search algorithm or an A* search algorithm. An A* search algorithm is a best first, graph search algorithm that finds the least-cost path from a given initial node to a one goal node. A breadth-first search algorithm is a graph search algorithm that begins at the root node and explores all the neighboring nodes. Then for each of those nearest nodes, it explores their unexplored neighbor nodes, and so on, until it finds the goal. Depth-first search is a searching algorithm for searching a tree, tree structure or graph structure which starts at the root and explores as far as possible along each branch before backtracking.

Yet another aspect is a method for arithmetic coding of uniform resource locator strings. The method includes inputting a plurality of uniform resource locators into an arithmetic coding engine to generate a plurality of arithmetic coded hash values. Each of the plurality of arithmetic coded hash values satisfies the rule that for every first uniform resource locator that is a strict prefix of a second uniform resource locator, the first uniform resource locator's resulting arithmetic coded hash value is a strict prefix of the second uniform resource locator's resulting arithmetic coded hash value. The method also includes storing plurality arithmetic coded hash values as a searchable list.

Yet another aspect of the present invention is a system for arithmetic coding of uniform resource locator strings. The system includes a processing engine comprising means for inputting a plurality of uniform resource locators into an arithmetic coding engine. The arithmetic coding engine codes generates a plurality of arithmetic coded hash values for the plurality of uniform resource locators. Each of the plurality of arithmetic coded hash values satisfies the rule that for every first uniform resource locator that is a strict prefix of a second uniform resource locator, the first uniform resource locator's resulting arithmetic coded hash value is a strict prefix of the second uniform resource locator's resulting arithmetic coded hash value. A database for storing the plurality of arithmetic coded hash values.

Yet another aspect is a system for controlling access to an Internet service. The system includes a network such as the Internet, a Web site and a local area network ("LAN"). The Web site is hosted at a first server and accessible over the Internet. The LAN comprises a plurality of client-side devices, each of the client side devices having a browser, and a security appliance. The security appliance controls access to the Internet by each of the plurality of client-side devices. The security appliance analyzes a hashed uniform resource locator for the Internet service. The hashed uniform resource locator has a string value within a predetermined string range and a hash value that is in character proximity to a hash value of another hashed uniform resource locator of a plurality of hashed uniform resource locators that has a string value within the predetermined string range. Access to the Internet service by any of the plurality of client-side devices is determined on a hash value of the hashed uniform resource locator being within a range established for the local area network.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
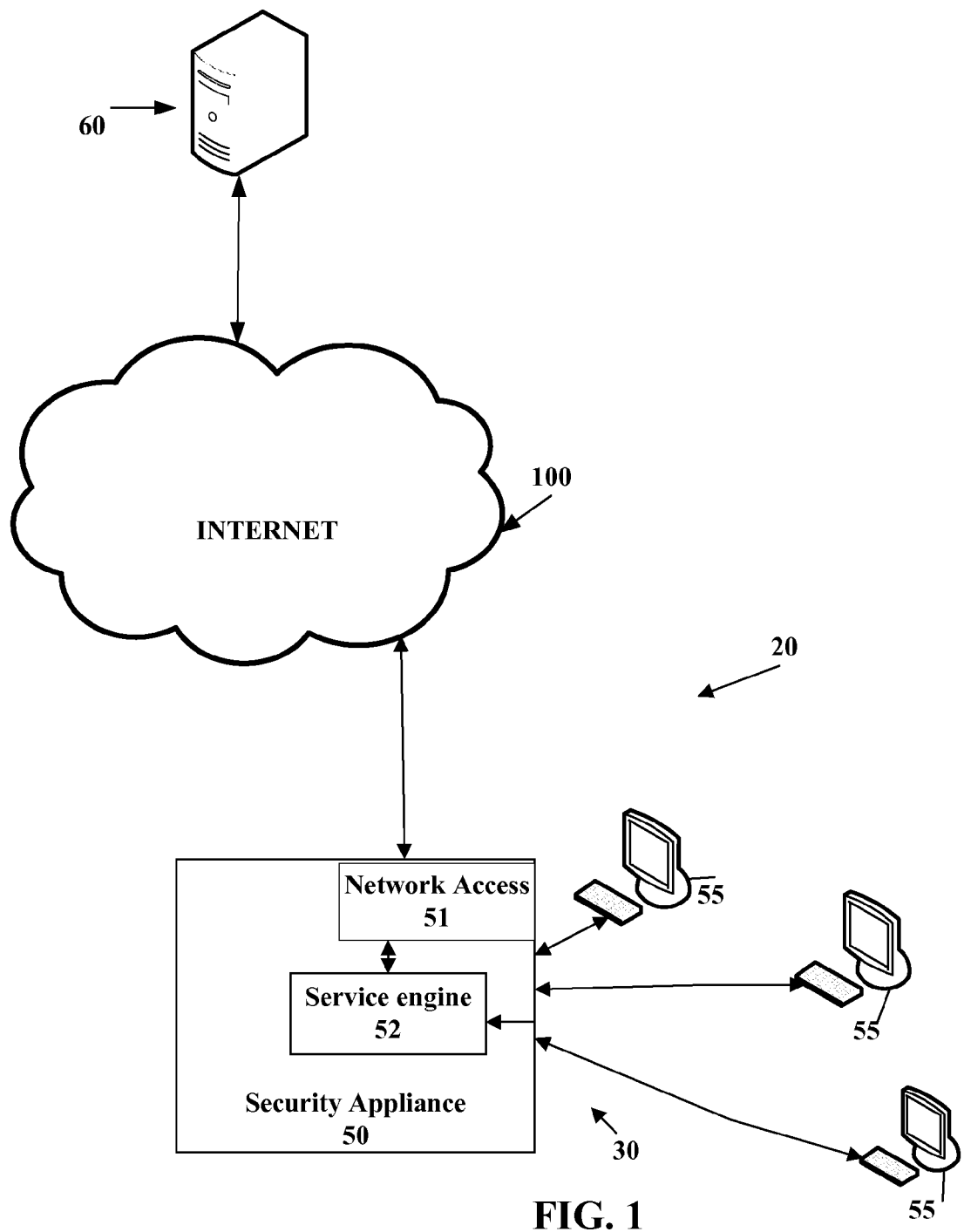
FIG. 1 is a block diagram of a system for controlling access to an Internet resource.

As shown in FIG. 1, a system for controlling access to an Internet resource is generally designated 20. The system 20 preferably comprises a local area network 30, the Internet 100 and an Internet resource located at a remote server 60. The Internet resource is preferably a Web site. A local area network ("LAN") 30 preferably comprises a security appliance 50 and a plurality of client-side devices 55. Each of the client-side devices 55 preferably has a Web-browser for accessing the Internet from the client side device 55. The security appliance 50 preferably comprises a network access 51 for permitting access to the Internet from the LAN 30, and a service engine 52 for analyzing a hash value of the URL for the requested Internet service in view of other hash values for URLs as established for the LAN 30.

Figure 2:
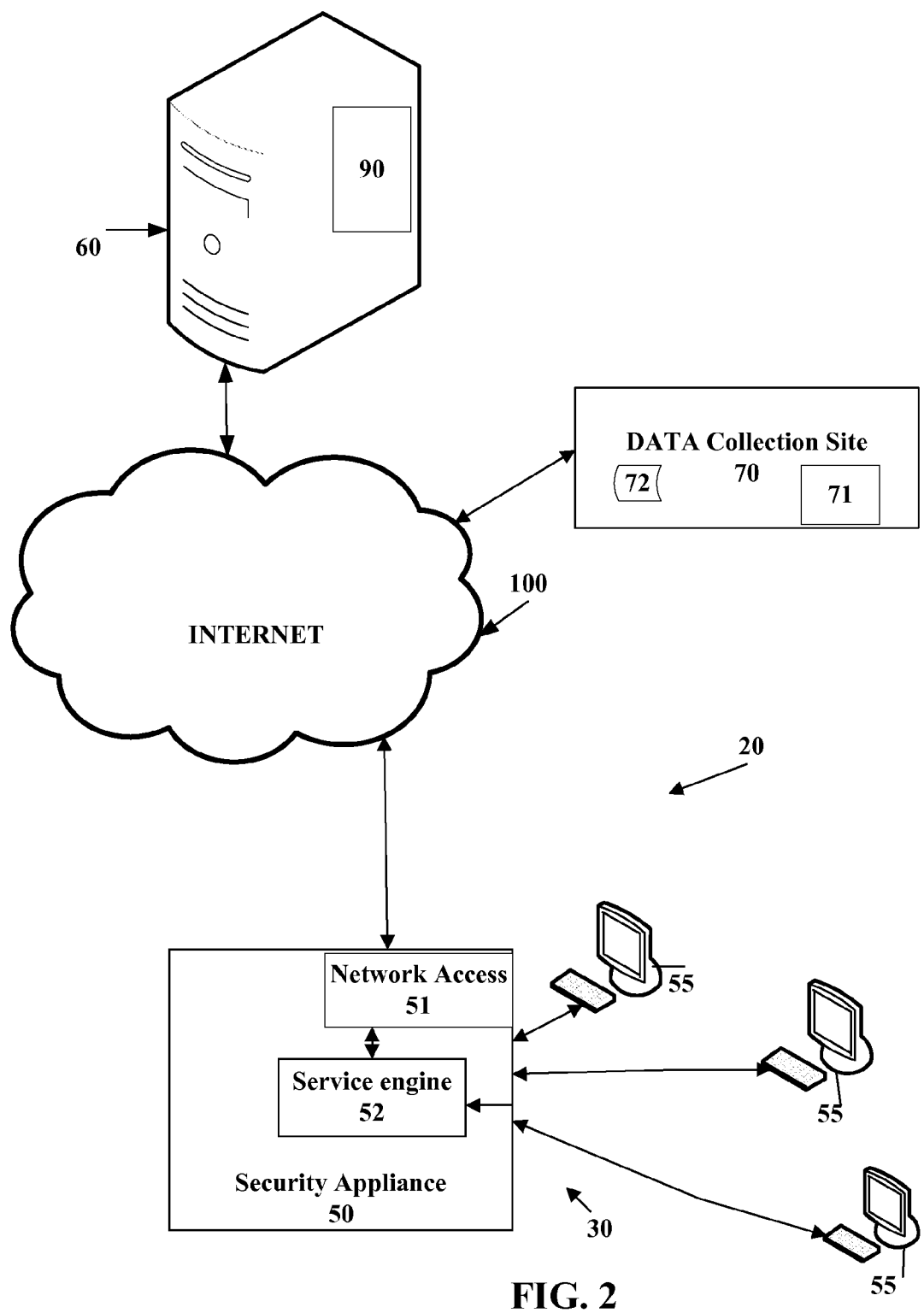
FIG. 2 is a block diagram of a system for controlling access to an Internet resource.

An alternative embodiment of the system 20 is illustrated in FIG. 2. The system 20 preferably comprises a LAN 30, the Internet 100, an Internet resource located at a remote server 60 and a data collection site 70 having a compression engine 71 and a database 72. The Internet resource is preferably a Web site. A local area network 30 preferably comprises a security appliance 50 and a plurality of client-side devices 55. Each of the client-side devices 55 preferably has a Web-browser for accessing the Internet from the client side device 55. The security appliance 50 preferably comprises a network access 51 for permitting access to the Internet from the LAN 30, and a service engine 52 for creating and analyzing a compressed string of the URL for the requested Internet service in view of a library of compressed strings for URLs as established for the LAN 30. The data collection site 70 provides the library of compressed strings for URLs to the service engine 52 of the security appliance 50. The data collection site 70 utilizes the compression engine 71 to compress URLs for Internet resources to create a list of compressed strings of URLs wherein each of the plurality of compressed strings satisfies the rule that every URL string P that is a strict prefix of a URL string S, P's resulting compressed string is a strict prefix of S's resulting compressed string.

The AC Hash output has the unique property of providing numeric proximity for URLs that are also close in string values. This allows for fuzzy matching on URL names and to apply a category across a "string range" of URLs. Using the example of google.com, the AC hash output is as shown in Table Three.

TABLE THREE

| URL | AC Hash Value |
| --- | --- |
| google.com/finance/djia | 128ecf542a35ac5270a87dc740918400 |
| google.com/finance | 128ecf542a35ac5270a87dc740900000 |
| google.com | 128ecf542a35ac5270a87dc740000000 |

In general using the AC hash algorithm, any URL based on google.com will have a hash value between two values, for instance 128ecf542a35ac5270a87dc740000000-128ecf542a35ac5270a87dc749999999 and the database contains ranges of AC Hash values that all have the same metadata (in this example, category, confidence and reputation values). Thus, the range 128ecf542a35ac5270a87dc740000000-128ecf542a35ac5270a87dc740899999 is in the category of highly reputable search engines, while 128ecf542a35ac5270a87dc740900000—128ecf542a35ac5270a87dc740950000 is in the category of highly reputable financial information. If a client then tests a new URL against this set of data, for example, google.com/finance/nasdaq, an AC hash value of 128ecf542a35ac5270a87dc740927691 is produced, which is in the category of highly reputable financial information, and differs from the database's exact match for that category 27691.

Figure 3:
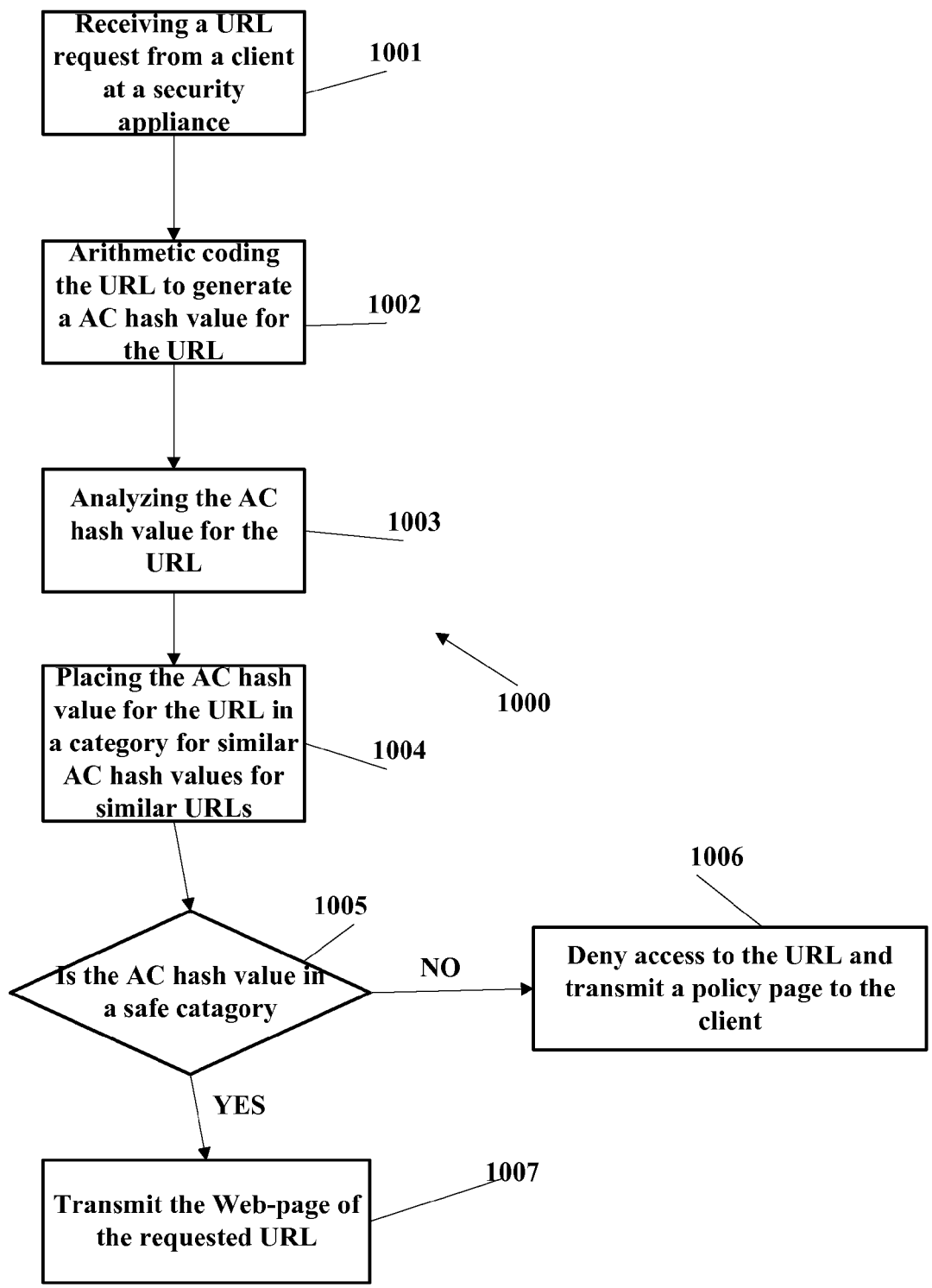
FIG. 3 is a flow chart of a general method for controlling access to an Internet resource.

A method 1000 for controlling access to an Internet resource is shown in FIG. 3. The method is preferably performed at a LAN 30. At block 1001, a URL request is received from a client device 55 at a security appliance 50. At block 1002, the URL is arithmetic coded to generate an AC hash value for the URL. At block 1003, the AC hash value for the URL is analyzed at the security appliance 50. At block 1004, the AC hash value for the URL is placed in a category for similar AC hash values for similar URLs. Thus, as discussed above, the AC hash value for the URL for google.com/finance/nasdaq is placed in a similar category to the AC hash value for the URL for google.com/finance. At decision 1005, an inquiry is made as to the placement and accessibility of the URL. Specifically, is the AC hash value for the URL in a safe category as established for the LAN 30? If the response is NO, then at block 1006 access to the URL is denied and a policy page is transmitted to the client 55. If the response is YES, then at block 1007 access to the URL is permitted and the Web-page of the requested URL is transmitted to the client 55.

Figure 4:
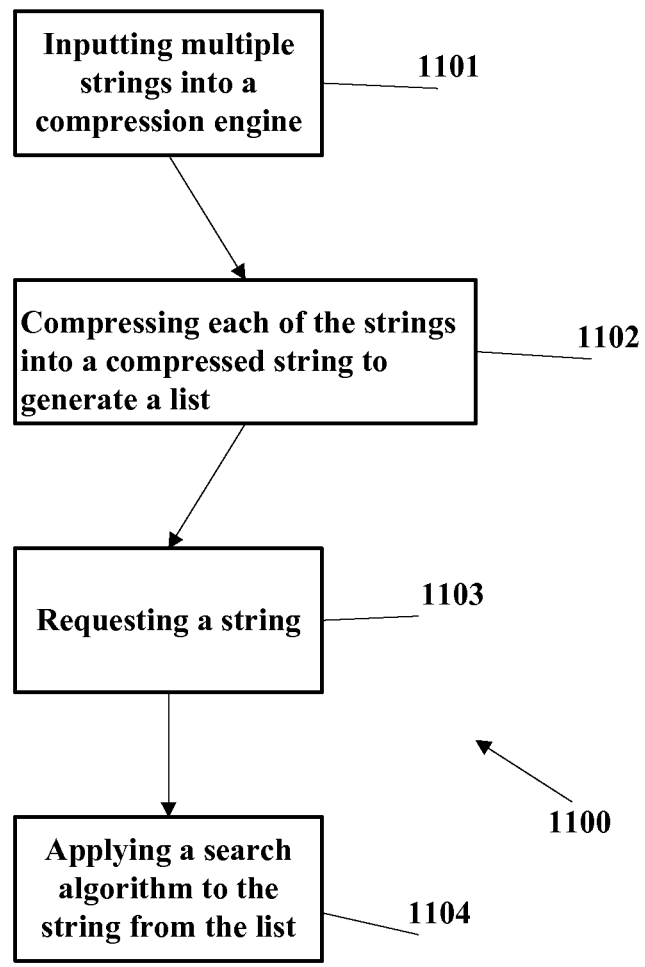
FIG. 4 is a flow chart of a method for compression coding strings.

A general method 1100 for compressing strings and searching the compressed strings is shown in FIG. 4. At block 1101, strings are inputted into a compression engine. At block 1102, the strings are compressed into new, prefix-preserving compressed string using the compression engine. For every string P that is a strict prefix of a string S, P's resulting compressed string is a strict prefix of S's resulting compressed string. At block 1103, a search string is requested and the requested search string is compressed using the same compression algorithm as utilized by the compression engine. At block 1104, a search algorithm is applied to find the resulting compressed string among the plurality of compressed strings.

The search for the compressed string is alternatively performed at a client library containing a list of compressed strings.

Figures 5, 6:
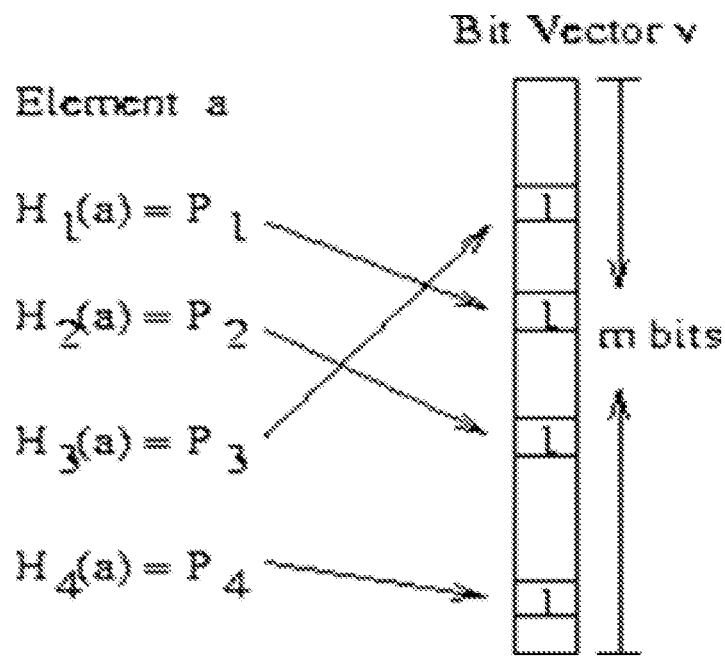
FIG. 5 is a representation of a probabilistic has table.
FIG. 6 is a representation of arithmetic coding of a string of code.

A probabilistic hash table is shown in FIG. 5. The probabilistic hash table works by creating an array of m bits with all 0's. To insert a new d="www.msn.com" apply k hash functions, $H_k$, to each and set all $H_k(d)$ mod m bits to 1. To check if a domain is in the set, apply k hash functions to the new domain and if all $H_k(d)$ mod m bits are set then the domain is in the set.

In a preferred method arithmetic coding is utilized by a compression engine to compress the strings. As shown in FIG. 6, arithmetic coding maps all strings to a number in [0,1). For example, two characters (X, Y) wherein $p(X)=\frac{2}{3}$ and wherein $p(Y)=\frac{1}{3}$. Divide [0,1), proportional to each symbol's probability. All strings starting with X will be in $(0,\frac{2}{3}]$ and all strings starting with Y will be in $(\frac{2}{3},1.0]$. For each character in the string, arithmetic coding continues to subdivide the interval by the same percentages.

Arithmetic coding compresses strings well such that the intervals are used for prefix searching. The string www.msn.com belongs to some interval (a,b]. The string www.msn.com/pagel.html belongs to (c,d]. The interval (c,d] has to be inside of (a,b]. . . . If the interval of a prefix is stored, then it can be determined if an incoming URL request is within the interval of a prefix.

Sorted list of arithmetic codes compress URLs using AC and stores them as a sorted list. In an alternative embodiment, a binary search algorithm is used to find the URLs (the lookup is Log$_2$(n)). AC URLs require less memory since compressed representation is stored and supports longest prefix matching for searching.

An arithmetic code is a long binary decimal number. 0.01110101001010010101011010101010100101. Practically, these are grouped into bytes and stored as integers 01110101 00101001 01010110 10101010 10010100→752956AA94. These are just sequences of bytes.

Figure 7:
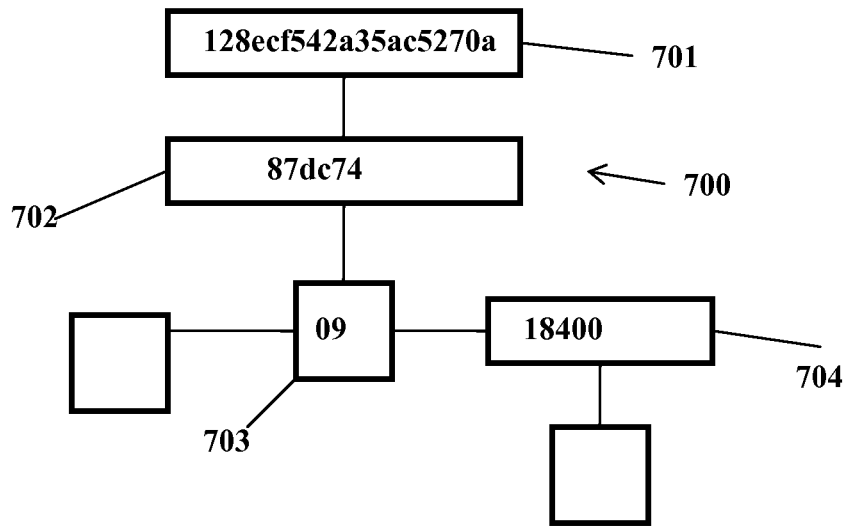
FIG. 7 is a representation of a trie.

In an alternative embodiment, the compressed strings are stored in a trie data structure. A trie representing the AC Hash value for google.com/finance/nasdaq {"128ecf542a35ac5270a", "87dc74", "09", "18400"} is shown in FIG. 7. A trie is a type of tree. The trie stores common prefixes in internal nodes as well as leaves and supports longest prefix matching which is useful for paths. In the storing the compressed strings in a trie data structure, the stored compressed string are searched using a search algorithm such as a breadth-first search algorithm, a depth-first search algorithm or an A* search algorithm.

Figure 8:
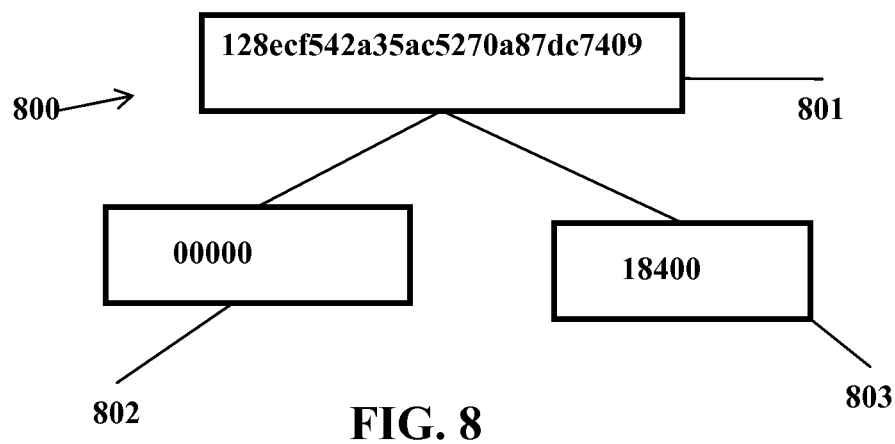
FIG. 8 is a representation of a Patricia trie.

In an alternative embodiment, the compressed strings are stored in a Patricia trie data structure. A Patricia trie representing AC Hash value for google.com/finance/nasdaq {"128ecf542a35ac5270a", "87dc74", "09", "18400"} is shown in FIG. 8. A Patricia trie compresses links within a trie to reduce the number of pointers. Pointers in the trie cost memory. For long sequences, savings are substantial. In the storing the compressed strings in a Patricia trie data structure, the stored compressed string are searched using a search algorithm such as a breadth-first search algorithm, a depth-first search algorithm or an A* search algorithm.

A Patricia trie of arithmetic codes compresses URLs using arithmetic coding then stores them in a Patricia trie. The storage in a Patricia trie requires less memory since compressed representation is stored. The storage in a Patricia trie takes advantage of common prefixes in compressed representations of domains, paths, or both and supports longest prefix matching.

Figure 9:
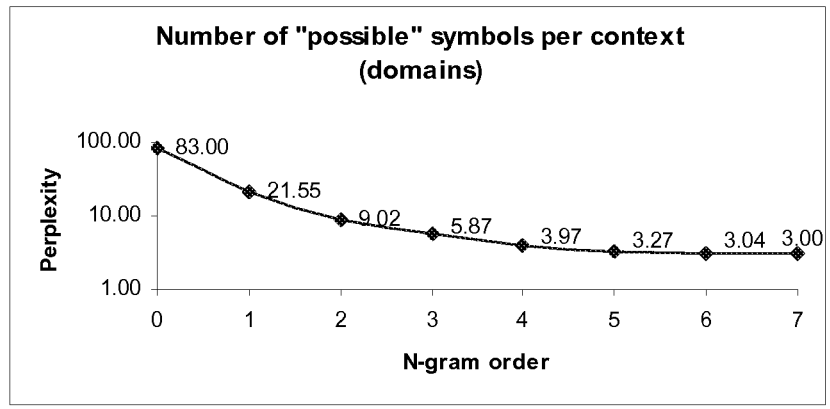
FIG. 9 is a graph of a number of possible symbols per context.
Figure 10:
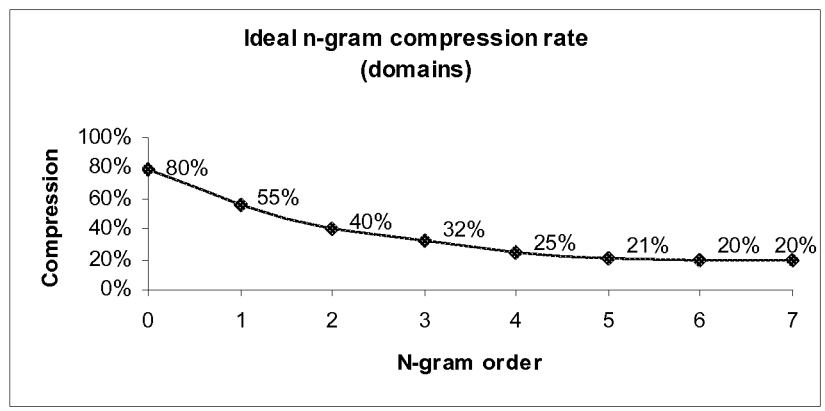
FIG. 10 is a graph of ideal n-gram compression rate.

As shown in FIGS. 9 and 10, a 3-byte (aka trigram) probability model: $p(c|c_{t-1},c_{t-2})$ is used. Domain compression resulted in 55% of the original size: 40% belongs to a traditional arithmetic code; 7% belongs to an interval prefix data; 8% belongs to an interval length data; Path compression resulted in 34% of the original size; 28% belongs to a traditional arithmetic code; 3% belongs to an interval prefix data; 3% belongs to an interval length data; Combined compression resulted in 53% of the original size; Weighted average of 90% domain bytes+10% path bytes.

Space requirements are just the compressed arithmetic code bytes, one per byte array. Domains: 55% of original. Paths: 34% of original. For a binary search over variable length byte arrays. Lookups were fast on 166,000 domains-6 μsec which is 166,667 lookups/sec, which is faster than similar length null terminated string compares. The amount of data is also smaller. The string length is read in first, then a memcmp is performed which is much faster than checking for an end of a string on each character read.

Figure 11:
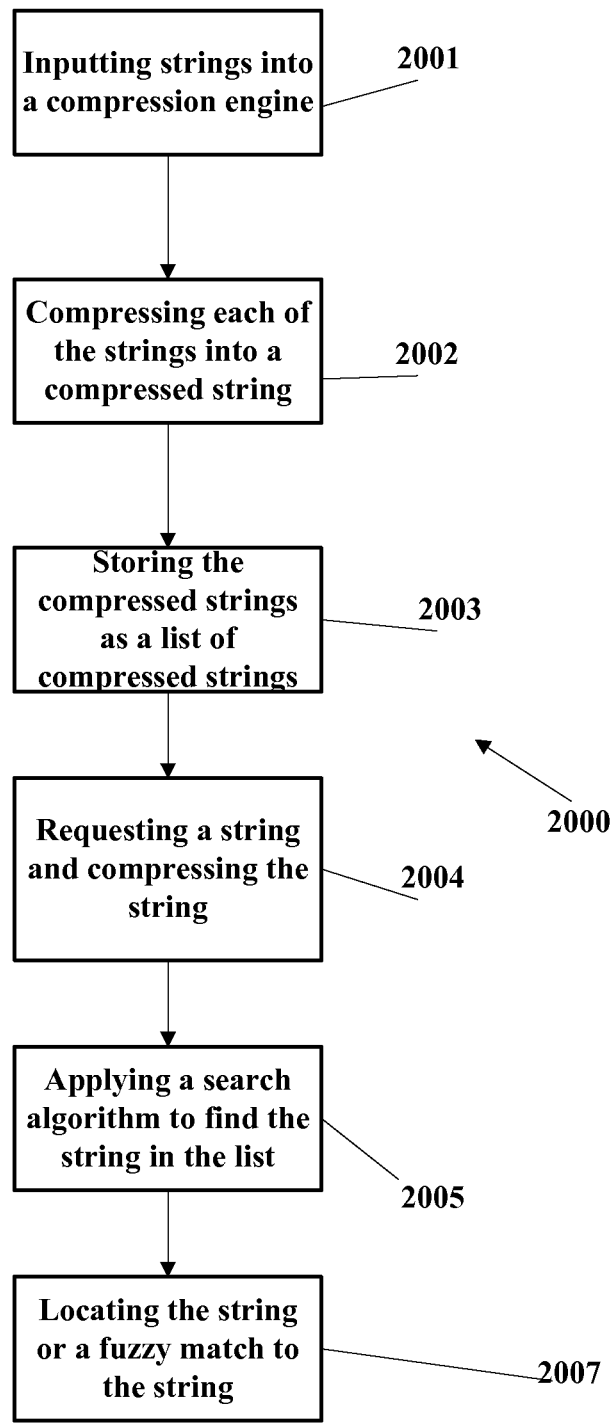
FIG. 11 is a flow chart of a general method for compressing strings and searching a particular compressed string.

A general method 2000 for compressing strings and searching a particular compressed string is shown in FIG. 11. At block 2001, strings are inputted into a compression engine. At block 2002, the strings are compressed using a compression algorithm such that for every string P that is a strict prefix of a string S, P's resulting compressed string is a strict prefix of S's resulting compressed string. At block 2003, the compressed strings are stored as a list of compressed strings. At block 2004, a request for a search string is made and the requested search string is compressed using the same compression algorithm as utilized by the compression engine. At block 2005, a search algorithm is applied to find the compressed search string among the list of compressed list strings. At block 2006, the compressed search string or a fuzzy match to the compressed search string is located among the list of compressed strings.

Figure 12:
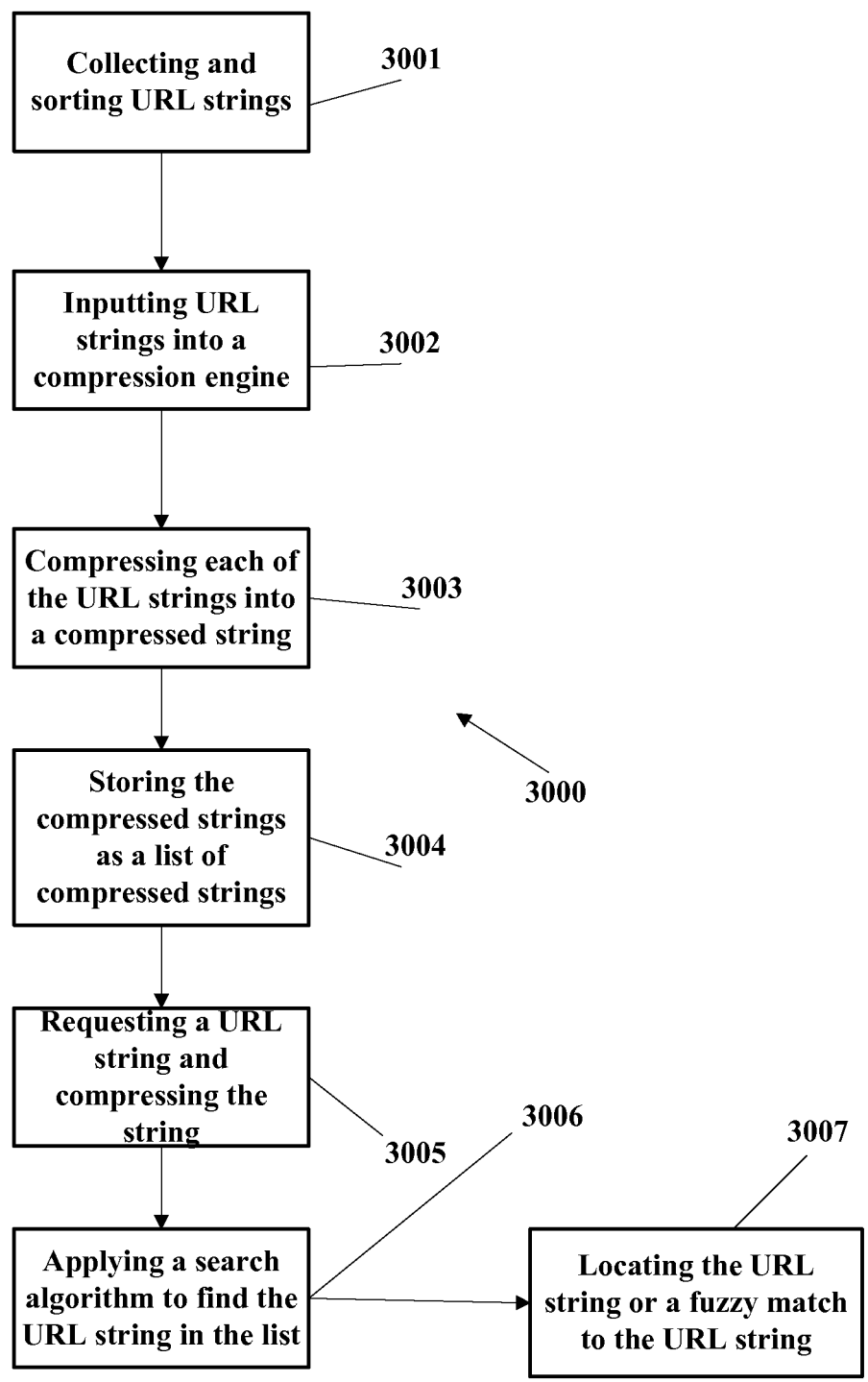
FIG. 12 is a flow chart of a specific method for compressing strings and searching a particular compressed string.

A specific method 3000 for compressing strings of URLs and searching for a particular compressed URL string is shown in FIG. 12. At block 3001, strings of URLs are collected and sorted in a particular manner for input into a compression engine. For example, the previously used example of "google.com/finance/djia" is sorted as "com.google:80:http/finance/djia" since http is implied to be port 80. At block 3002, the sorted strings of URLs are inputted into a compression engine. At block 3003, the strings of URLs are compressed using a compression algorithm such that for every string P that is a strict prefix of a string S, P's resulting compressed string is a strict prefix of S's resulting compressed string. At block 3004, the compressed strings of URLs are stored as a list of compressed strings of URLs. Preferably, the list of compressed strings of URLs is stored as a client library at a user LAN for access by the LAN to determine accessibility to URLs requested by client devices of the LAN. A policy for accessibility of URLs can be established at the LAN and the client library facilitates that policy since like URLs are grouped due to the rule that for every string P that is a strict prefix of a string S, P's resulting compressed string is a strict prefix of S's resulting compressed string. Further, compressing of the strings of URLs provides a list in a uniform distribution. At block 3005, a request for a search string URL is made and the requested search string URL is compressed using the same compression algorithm as utilized by the compression engine. At block 3006, a search algorithm is applied to find the compressed search string URL among the list of compressed list strings. Preferably an interpolation search is utilized to search the list. Typically, for a list with a uniform distribution, an interpolation search makes about 0 log(log(n)) comparisons where n is the number of elements to be searched. At block 3007, the compressed search string URL or a fuzzy match to the compressed search string URL is located among the list of compressed strings.

Figure 13:
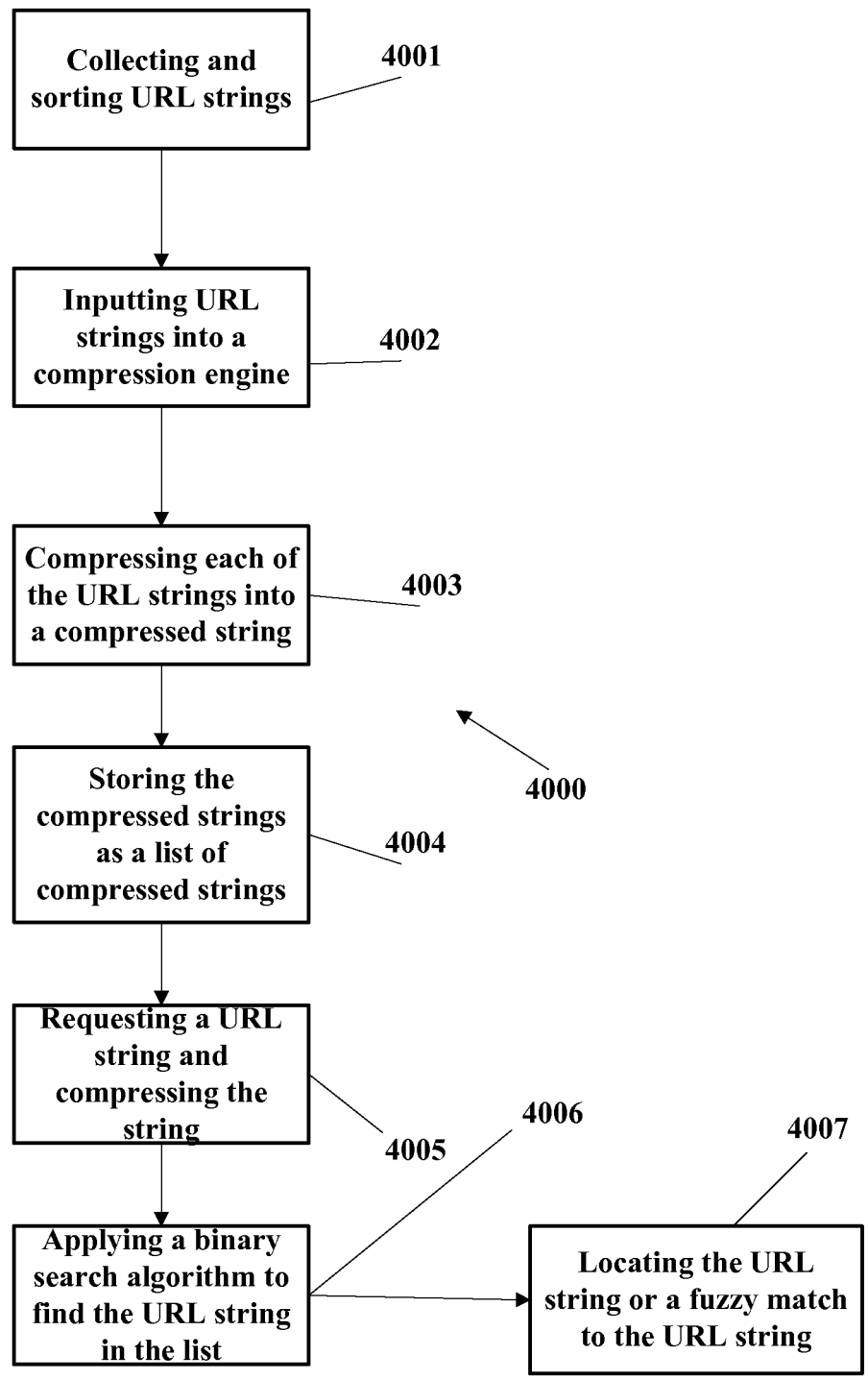
FIG. 13 is a flow chart of a specific method for compressing strings and searching a particular compressed string.

A specific method 4000 for compressing strings of URLs and searching for a particular compressed URL string is shown in FIG. 13. At block 4001, strings of URLs are collected and sorted in a particular manner for input into a compression engine. For example, the previously used example of "google.com/finance/djia" is sorted as "com.google:80:http/finance/djia" since http is implied to be port 80. At block 4002, the sorted strings of URLs are inputted into a compression engine. At block 4003, the strings of URLs are compressed using a compression algorithm such that for every string P that is a strict prefix of a string S, P's resulting compressed string is a strict prefix of S's resulting compressed string. At block 4004, the compressed strings of URLs are stored as a list of compressed strings of URLs. Preferably, the list of compressed strings of URLs is stored as a client library at a user LAN for access by the LAN to determine accessibility to URLs requested by client devices of the LAN. A policy for accessibility of URLs can be established at the LAN and the client library facilitates that policy since like URLs are grouped due to the rule that for every string P that is a strict prefix of a string S, P's resulting compressed string is a strict prefix of S's resulting compressed string. Further, compressing of the strings of URLs provides a list in a uniform distribution. At block 4005, a request for a search string URL is made and the requested search string URL is compressed using the same compression algorithm as utilized by the compression engine. At block 4006, a search algorithm is applied to find the compressed search string URL among the list of compressed list strings. Preferably a binary search is utilized to search the list. A binary search makes about O(log n) comparisons where n is the number of elements to be searched. At block 4007, the compressed search string URL or a fuzzy match to the compressed search string URL is located among the list of compressed strings.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method of searching for a particular string among one or more prefix-preserving compressed strings, the method comprising:

receiving a plurality of strings at a data collection site, wherein a subset of the plurality of strings have a strict prefix;

compressing, using a compression engine at the data collection site, the plurality of strings into a plurality of prefix-preserving compressed strings, wherein the plurality of prefix-preserving compressed strings comprises a compressed subset of strings corresponding to the subset of the plurality of strings such that the compressed subset of strings have a matching compressed strict prefix;

storing the prefix-preserving compressed strings; and compressing a particular string to obtain a compressed particular string and applying a search algorithm to find the compressed particular string among the stored prefix-preserving compressed strings.

2. The method according to claim 1, wherein one or more strings of the plurality of strings represents at least one of: a uniform resource locator, and an IP address.

3. The method according to claim 1, further comprising:

storing one or more of the prefix-preserving compressed strings in at least one of: an ordered list data structure, a database, a tree data structure, a graph data structure, a trie data structure, and a client library.

4. The method according to claim 1, wherein the compression engine comprises at least one of: a dictionary based compression engine, an entropy based compression engine, a run-length compression engine, an LZ77 compression engine, an LZ78 compression engine, an LZW compression engine, a Huffman compression engine, a Golomb compression engine, a universal code compression engine, an Elias gamma compression engine, a dynamic markov compression engine, and an arithmetic compression engine.

5. The method according to claim 1, wherein the search algorithm comprises at least one of: a linear search, a binary search, an interpolation search, a select query, a full text search, a search or find database operation, a breadth-first search algorithm, a depth-first search algorithm, an A* search algorithm, a breadth-first trie search algorithm, a depth-first trie search algorithm, and an A* trie search algorithm.

6. The method according to claim 1, further comprising:

determining a closest matching string in the one or more prefix-preserving compressed strings, the closest matching string having a longest common prefix with the compressed particular string.

7. A system for compressing one or more strings, the system comprising:
- a network;
- a data collection site on the network, the data collection site comprising a compression engine, the compression engine adapted to:
  - receive a plurality of strings, wherein a subset of the plurality of strings have a strict prefix; and
  - convert the plurality of strings into prefix-preserving compressed strings, wherein the plurality of prefix-preserving compressed strings comprises a compressed subset of strings corresponding to the subset of the plurality of strings such that the compressed subset of strings have a matching compressed strict prefix; and
- a security appliance, the security appliance configured to store the one or more prefix-preserving compressed strings and apply a search algorithm to find a particular compressed string among the one or more prefix-preserving compressed strings.

8. The system according to claim 7, wherein one or more strings of the plurality of strings represents at least one of: a uniform resource locator, and an IP address.

9. The system according to claim 7, wherein the compression engine comprises at least one of: a dictionary based compression engine, an entropy based compression engine, a run-length compression engine, an LZ77 compression engine, an LZ78 compression engine, an LZW compression engine, a Huffman compression engine, a Golomb compression engine, a universal code compression engine, an Elias gamma compression engine, a dynamic markov compression engine, and an arithmetic compression engine.

10. The system according to claim 7, wherein the search algorithm comprises at least one of: a linear search, a binary search, an interpolation search, a select query, a full text search, a search or find database operation, a breadth-first search algorithm, a depth-first search algorithm, an A* search algorithm, a breadth-first trie search algorithm, a depth-first trie search algorithm, and an A* trie search algorithm.

11. A method for arithmetic coding uniform resource locator strings, the method comprising:
- receiving a plurality of uniform resource locators at an arithmetic coding engine, each of the plurality of uniform resource locators having a string value;
- analyzing the string value of each of the plurality of uniform resource locators;
- generating an arithmetic coded hash for each of the plurality of uniform resource locators according to the string value of each of the plurality of uniform resource locators to create a plurality of hashed uniform resource locators; and
- grouping each of the plurality of hashed uniform resource locators according to a hashed string value of each of the plurality of uniform resource locators to create a subset of the plurality of hashed uniform resource locators;
- wherein a first hashed uniform resource locator of the plurality of hashed uniform resource locators has a string value that is within a predetermined string range and has a numeric hash value that is in character proximity to a numeric hash value of a second hashed uniform resource locator of the plurality of hashed uniform resource locators having a string value within the predetermined string range.

12. The method according to claim 11, wherein each of the plurality of uniform resource locators represents a Web site.

13. The method according to claim 11, wherein the uniform resource locator has a hash value of 32 characters.

14. The method according to claim 11, further comprising: storing the plurality of hashed uniform resource locators in a database.

15. The method according to claim 11, further comprising: storing the plurality of hashed uniform resource locators in a client library.

16. The method according to claim 11, further comprising: transmitting the plurality of hashed uniform resource locators over a network to a local area network to be stored in a database of the local area network.

17. The method according to claim 16, further comprising:
- receiving a request for an Internet service at a security appliance of the local area network from a client-side device, the client-side device controlling access to the Internet;
- analyzing a hashed uniform resource locator for the Internet service, the hashed uniform resource locator having a string value within a predetermined string range and a numeric hash value that is in character proximity to a numeric hash value of another hashed uniform resource locator of the plurality of hashed uniform resource locators that has a string value within the predetermined string range; and
- determining access to the Internet service based on the numeric hash value of the hashed uniform resource locator being within a range established for the local area network.

18. The method according to claim 17, wherein the client-side device is a personal computer.

19. The method according to claim 17, wherein the client-side device is a PDA.

20. The method according to claim 17, wherein the Internet service is a Web site.

21. The method according to claim 16, further comprising:
- receiving a uniform resource locator request for an Internet service at a security appliance of the local area network from a client-side device, the client-side device controlling access to an Internet service;
- analyzing an arithmetic coded hash value for the uniform resource locator for the Internet service to determine if the arithmetic coded hash value is within an interval of a prefix; and
- conditioning access to the Internet service based on whether the arithmetic coded hash value for the uniform resource locator is within the interval of a prefix.

22. The method according to claim 11, wherein generating the arithmetic coded hash for each of the plurality of uniform resource locators is performed at a data collection site.

23. A system for compressing one or more strings, the system comprising:
- a network comprising at least one client side device;
- a data collection site on the network, the data collection site comprising a compression engine, the compression engine comprising:
- means for receiving a plurality of strings, wherein a subset of the plurality of strings have a strict prefix;
- means for compressing the plurality of strings into one or more prefix-preserving compressed strings, wherein the plurality of prefix-preserving compressed strings comprises a compressed subset of strings corresponding to the subset of the plurality of strings such that the compressed subset of strings have a matching compressed strict prefix;

means for storing the one or more prefix-preserving compressed strings; and means for applying a search algorithm to find one or more compressed strings from the one or more prefix-preserving compressed strings.

\* \* \* \* \*